(12) United States Patent
Suda et al.

(10) Patent No.: US 7,613,101 B2
(45) Date of Patent: Nov. 3, 2009

(54) RECEIVING PROCESSING METHOD AND APPARATUS

(75) Inventors: Kenji Suda, Kawasaki (JP); Hirovuki Seki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 770 days.

(21) Appl. No.: 11/188,073

(22) Filed: Jul. 22, 2005

(65) Prior Publication Data

US 2005/0254414 A1   Nov. 17, 2005

(30) Foreign Application Priority Data

Apr. 25, 2005   (JP) ............................. 2005-126169

(51) Int. Cl.
*H04J 11/00*   (2006.01)
*H04J 3/18*    (2006.01)
*H04Q 7/24*    (2006.01)

(52) U.S. Cl. ...................... 370/203; 370/338; 370/477; 370/503; 375/260

(58) Field of Classification Search ......... 370/203–210, 370/338, 350, 480–485, 477, 503, 512, 516, 370/520; 375/260, 354, 362–368, 343
See application file for complete search history.

(56) References Cited

U.S. PATENT DOCUMENTS

2005/0013383 A1*   1/2005   Sudo et al. .................. 375/260

FOREIGN PATENT DOCUMENTS

JP   2000-151542   5/2000

* cited by examiner

*Primary Examiner*—Afsar M. Qureshi
(74) *Attorney, Agent, or Firm*—Katten Muchin Rosenman LLP

(57) ABSTRACT

The apparatus includes a receiver unit which receives data; and a guard interval combining unit which combines the whole of the guard interval of the data, which is received by the receiver unit, with the valid symbol. This arrangement makes it possible to efficiently improve reception characteristic by effectively using the guard interval, while suppressing the apparatus size and the cost.

14 Claims, 19 Drawing Sheets

| INPUT | OUTPUT |
|---|---|
| QPSK | COMBINE |
| 16QAM | COMBINE |
| 64QAM | NON-COMBINE |

802B

| INPUT | OUTPUT |
|---|---|
| 1/3 | COMBINE |
| 1/2 | COMBINE |
| 3/4 | NON-COMBINE |

| INPUT | OUTPUT |
|---|---|
| QPSK,1/3 | COMBINE |
| QPSK,1/2 | COMBINE |
| QPSK,3/4 | NON-COMBINE |
| 16QAM,1/3 | COMBINE |
| 16QAM,1/2 | NON-COMBINE |
| 16QAM,3/4 | NON-COMBINE |

RECEIVING PROCESSING METHOD AND APPARATUS

CROSS REFERENCE TO RELATED APPLICATIONS

This application is based on and hereby claims priority to Japanese Application No. 2005-126169 filed on Apr. 25, 2005 in Japan, the contents of which are hereby incorporated by reference.

BACKGROUND OF THE INVENTION

1. Field of the Invention

The present invention relates to a receiving processing method and a receiving apparatus. The invention relates particularly to an art which is suitable for use in communication systems which employ the multipath interference countermeasure technology, so-called guard interval, such as the OFDM (Orthogonal Frequency Division Multiplexing) access method.

2. Description of the Related Art

OFDM is considered to be a promising access method in the next-generation (fourth generation) mobile communication system. OFDM has recently been employed in communication applications which realize networks such as digital terrestrial television broadcasting, ADSL (Asynchronous Digital Subscriber Line), and high-speed wireless LAN (Local Area Network).

OFDM uses different subcarriers (propagation waves) each having a unique center frequency, thereby realizing a high frequency efficiency. That is, transmission data is subjected to serial/parallel (S/P) conversion to divide the data into smaller segments, and modulation is performed to add the segments onto different subcarriers (sub-propagation waves) which have been complex modulated into I and Q components, and inverse fast Fourier transformation (IFFT) processing is performed to transmit the data in parallel. By means of dividing the data as described above, the symbol transmission rate per propagation wave can be reduced in comparison with serial transmission.

As a result, overall influence of fading (a phenomenon in which the intensity of a signal in radio communication greatly varies time-wise and space-wise) is reduced. In addition, upon transmission, each sub-propagation wave band is "orthogonal" with every other sub-propagation wave band, so that adjacent propagation wave bands will not interfere with each other even if they are so close that they overlap.

Further, for the purpose of providing an improved immunity to multipath interference, OFDM normally uses a "guard interval (GI)" which is a part of data sent redundantly in time, so that if signals (ghost) deviating in time, due to diffuse reflection or the like, arrive at the receiver position, it is possible to provide a system resistant to multipath interference.

A guard interval (GI) is a copy of the later half (last) portion of the valid symbol 100 appended to the front of the symbol, as shown in FIG. 18. This means that the length of one OFDM symbol is lengthened by the length of the guard interval 101, taking the delay times of multipath waves (delay waves) into consideration.

Here, the OFDM signal receiver end performs the processing inverse of that performed by the transmitter end. More specifically, the guard interval 101 is removed from the received signal, and different subcarrier signals are reproduced by Fast Fourier Transformation (FFT), and the received data is demodulated, and parallel/serial (P/S) conversion is performed to obtain data as the received signal.

As shown in FIG. 19, use of the guard interval 101 makes it possible to accommodate only the valid symbol portion 100 in the FFT interval (FFT subject time scope) when the amounts of delay of delay waves are equal or smaller than the guard interval length (period) (see delay wave 1 and delay wave 2), so that the deterioration of the characteristic caused by the delay waves 1 and 2 is greatly reduced (can be substantially ignored). Accordingly, an increased guard interval length will make possible the avoidance of multipath interference even when the amount of delay of delay waves included in the received signal of a mobile terminal is great.

However, if a delay wave exceeds the guard interval length (see delay wave 3), a component of the preceding symbol is mixed into the object symbol, thereby causing inter-symbol interference, so that reception characteristics are deteriorated. In addition, as the cell radius becomes increasingly greater, the amount of delay of a delay wave also becomes greater, resulting from an increase in the signal propagation distance.

Consequently, as the cell radius becomes increasingly greater, the length of the guard interval to be inserted into the OFDM signal transmitted over the radio zone of the cell needs to be increased. However, since guard intervals 101 are used as a countermeasure against delay waves, guard intervals 101 which are likely to be influenced by delay waves will not be subjected to the reception FFT, and are removed from the received signal as already described above (see FIG. 20).

Here, in cellular systems, an environment where the cell radius is several tens of km can exist. Thus, in a case where the length of a guard interval 101 is set to a distance to the edge of the cell or to a distance in conformity to the above, since a delay wave is short in the vicinity of the cell, if the guard interval 101 is simply removed, the remaining long guard interval 101, which is not affected by the delay waves, becomes useless, thereby causing deterioration in transmission efficiency.

Hence, as proposed in the following patent document 1, as shown in FIG. 21, a portion 1010 of the guard interval 101 which is not influenced by a delay wave (which does not interfere with another symbol) is found out, and only this portion 1010 is combined with the received symbol (valid symbol portion 100). In this manner, effective use of the portion 1010 of the guard interval 101, which portion does not interfere with another symbol, makes possible good reception even when a level variation due to e.g., fading occurs.

[Patent Document 1] Japanese Patent Application Laid-Open No. 2000-151542

However, since the above-mentioned previous art needs a special detecting means (inter-symbol interference detecting circuit) for detecting the portion 1010 which does not interfere with another symbol, it is accompanied by an issue of an increase in the size of the apparatus and the cost. Further, since the art of the above patent document 1 does not take the transmission condition (modulation scheme and/or coding rate) of the transmission data into consideration, it cannot necessarily be said that the optimum reception characteristic is obtained.

SUMMARY OF THE INVENTION

With the foregoing problems in view, it is an object of the present invention to provide a receiving processing method and apparatus which are capable of efficiently improving reception characteristics by effectively using guard intervals while suppressing the apparatus size and the cost.

In order to accomplish the above object, according to the present invention, there is provided the following reception processing method and apparatus.

(1) As a generic feature, there is provided a receiving processing method performed at a receiver end in a communication system which has a function of transmitting a part of a valid symbol of data, as a guard interval, redundantly in time, for providing immunity to multipath interference, said processing comprising: receiving the data; and combining the whole of the guard interval of the data with the valid symbol.

(2) As a preferred feature, the guard interval is selectively combined with the valid symbol, based on at least a transmission condition relating to the data.

(3) As another preferred feature, the communication system has a function of notifying the receiver end of the modulation scheme information, which relates to the modulation scheme of the data, as a transmission condition, and the receiving processing method further comprises: evaluating whether or not the guard interval is to be combined with the valid symbol based on the notified transmission condition; and combining, if the evaluation result is positive, the guard interval with the valid symbol.

(4) As yet another preferred feature, the communication system has a function of notifying the receiver end of the encoding rate information, which relates to the encoding rate of the data, as a transmission condition, and the receiving processing method further comprises: evaluating whether or not the guard interval is to be combined with the valid symbol based on the notified transmission condition; and combining, if the evaluation result is positive, the guard interval with the valid symbol.

(5) As another generic feature, there is provided a receiving apparatus in a communication system which has a function of transmitting a part of a valid symbol of data, as a guard interval, redundantly in time, for providing immunity to multipath interference, the apparatus comprising: a receiver means which receives the data; and a guard interval combining means which combines the whole of the guard interval of the data, which is received by the receiver means, with the valid symbol.

According to the above invention, the whole guard interval of the received signal is combined with the valid symbol portion, irrespective of the presence and absence of the influence of a delay wave, thereby making possible effective use of the guard interval. As a result, reception characteristics can be improved without the necessity of preparing any special circuit, conventionally used, for detecting inter-symbol interference, that is, without increasing the apparatus size or the cost.

Other objects and further features of the present invention will be apparent from the following detailed description when read in conjunction with the accompanying drawings.

BRIEF DESCRIPTION OF THE DRAWINGS

FIG. 6 is a table showing example contents of an evaluation table used by the combination evaluating unit of FIG. 5;

FIG. 12 is a table showing example contents of an evaluation table used by the combination evaluating unit of FIG. 11;

DESCRIPTION OF THE PREFERRED EMBODIMENT(S)

[1] First Embodiment

Figure 1:
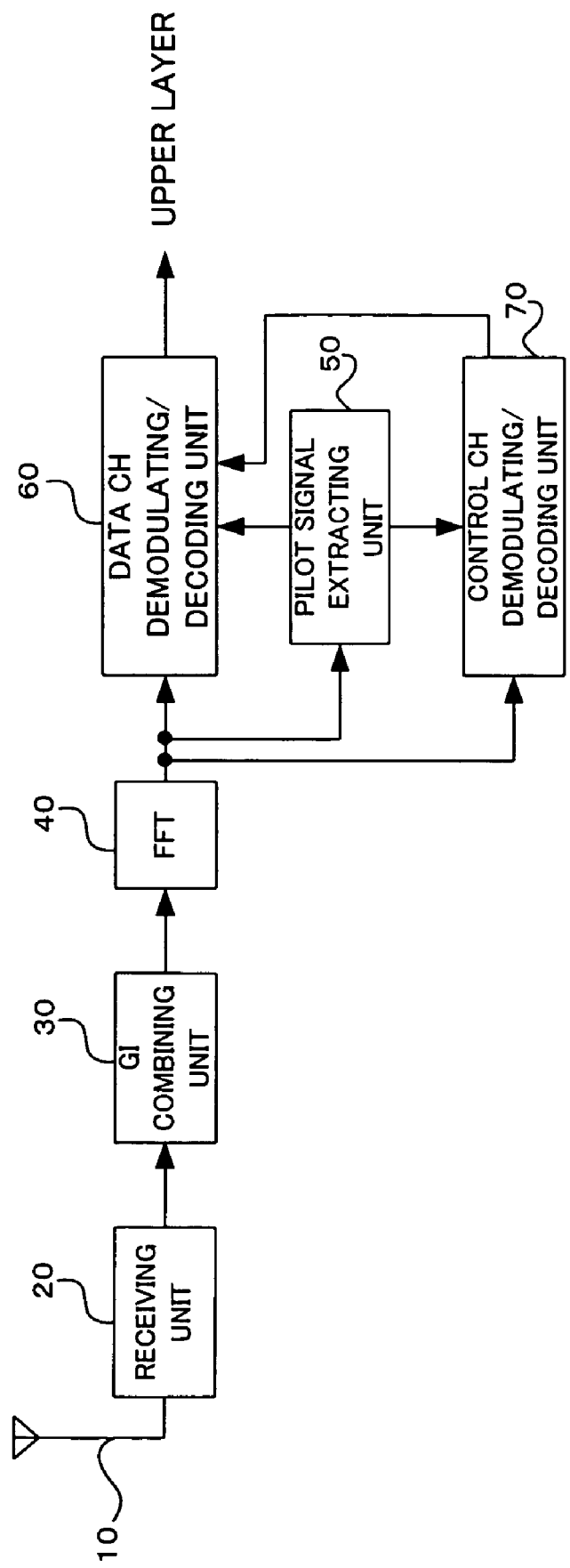
FIG. 1 is a block diagram showing an essential part of an OFDM receiving apparatus according to a first embodiment of the present invention.

FIG. 1 is a block diagram showing an essential part of an OFDM receiving apparatus according to a first embodiment of the present invention. The OFDM receiving apparatus of the first embodiment of FIG. 1 includes e.g., a receiving antenna 10, a receiving unit 20, a guard interval (GI) combining unit 30, an FFT processing unit 40, a pilot signal extracting unit 50, a data channel (CH) demodulating/decoding unit 60, and a control channel demodulating/decoding unit 70.

Figure 2:
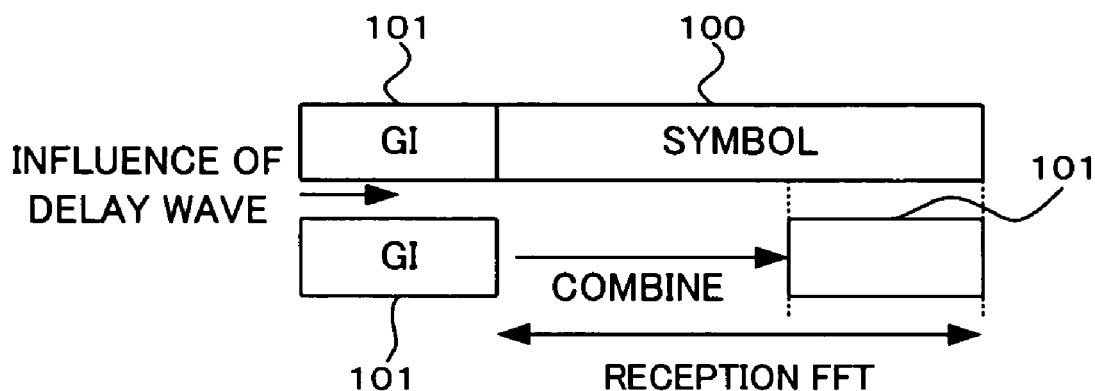
FIG. 2 is a schematic diagram for describing processing (simple addition method) performed by a guard interval (GI) combining unit of FIG. 1.
Figure 3:
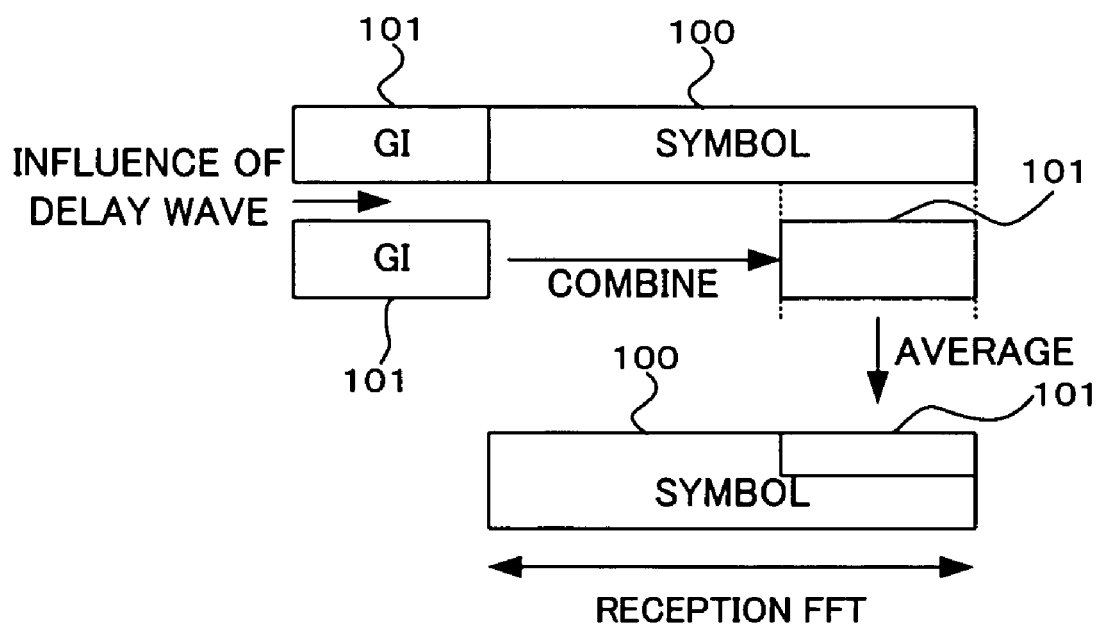
FIG. 3 is a schematic diagram for describing processing (averaging method) performed by a guard interval (GI) combining unit of FIG. 1.

The receiving unit (receiver means) 20 receives a radio frequency (RF) signal (OFDM signal) through the receiving antenna 10 and performs necessary processing, such as down-conversion to an intermediate frequency (IF) signal, A/D conversion, and orthogonal demodulation, on the received signal. The GI combining unit (guard interval combining means) 30, as shown in FIG. 2, simply combines the whole guard interval 101 of the received signal with a received symbol (valid symbol portion 100) which is to be subjected to receive-FFT performed by the FFT 40, irrespective of the presence and absence of influence of delay waves (interference with another symbol). For example, a received guard interval delayed by a valid symbol period makes it possible to combine the copy source of the guard interval with the valid symbol portion 100. As to a method for combining the guard interval 101 with the valid symbol 100, which is performed by the guard interval combining means 30, it can be executed by a simple addition method as shown in FIG. 2, or alternatively, by an averaging method as shown in FIG. 3. In other words, the guard interval combining means 30 can be configured as a simple addition unit or an averaging unit (the same will hold in the following embodiments).

The FFT processing unit 40 performs FFT processing on the valid symbol portion 100 with which the guard interval 101 is combined by the guard interval combining means 30, and the pilot signal extracting unit 50 extracts a pilot signal included in the received signal which has undergone FFT processing by the FFT processing unit 40.

On the basis of the pilot signal extracted by the pilot signal extracting unit 50, the control channel demodulating/decoding unit 70 demodulates and decodes the received signal. The data channel demodulating/decoding unit 60 demodulates and decodes the data channel of the received signal based on the pilot signal extracted by the pilot signal extracting unit 50 and on information of the control channel demodulated and decoded by the control channel demodulating/decoding unit 70, and then sends the received data to an upper layer (e.g., deinterleaving processing and error correction processing).

That is, the communication system of the present example has a function of notifying the receiver end of information relating to the modulation scheme or the coding rate on the transmitter end, as a data transmission condition, through a control channel. Here, the data channel demodulating/decoding units 60 and 70 perform demodulating/decoding processing corresponding to the modulation scheme (QPSK (Quadrature Phase Shift Keying), 16 QAM (Quadrature Amplitude Modulation), etc.) and the coding scheme (turbo coding, etc.) employed on the transmitter end.

In the OFDM receiving apparatus of the present embodiment constructed as described above, a radio signal (OFDM signal) is received by the receiving unit 20 via the receiving antenna 10, which receiver means 20 then performs necessary processing, such as downconversion, A/D converstion, and orthogonal demodulation, on the received signal, and after that, the signal enters the guard interval combining means 30.

The GI combining unit 30, as already described with reference FIG. 2 (or FIG. 3), combines (by simple addition or averaging) the whole guard interval 101 of the received signal with the valid symbol portion 100, and the signal enters the FFT processing unit 40 and is subjected to FFT processing. After that, the pilot signal extracting unit 50 extracts a pilot signal from the received signal which has been subjected to FFT processing by the FFT processing unit 40. On the basis of the extracted pilot signal, the control channel demodulating/decoding unit 70 demodulates and decodes the control channel of the received signal, and then, the data channel demodulating/decoding unit 60 demodulates and decodes the data channel of the received signal based on the control channel and the pilot signal. After that, the received data is sent to an upper layer.

In this manner, the OFDM receiving apparatus of the present invention efficiently uses the whole guard interval 101 of the received signal by simply combining the whole guard interval 101 with the valid symbol portion 100 irrespective of the presence or absence of influence of delay waves. This will eliminate the necessity of special circuitry conventionally used for detecting inter-symbol interference, so that reception characteristics are improved without increasing the size and the cost of the apparatus.

[2] Second Embodiment

Figure 4:
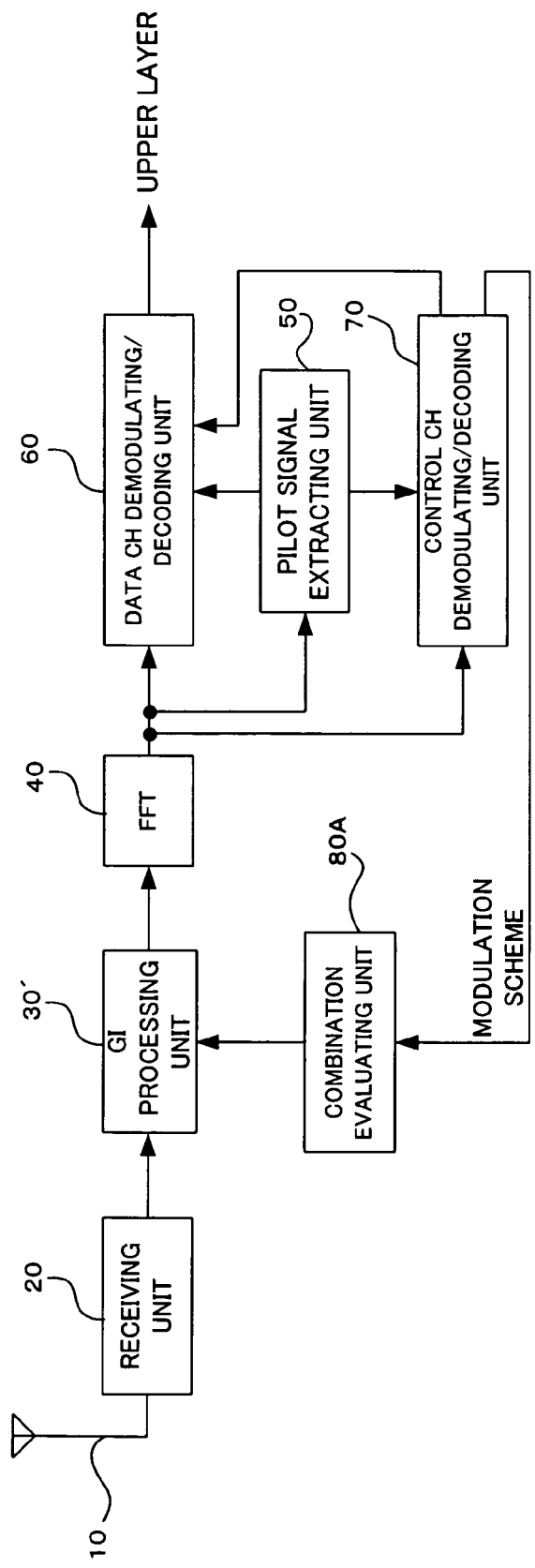
FIG. 4 is a block diagram showing an essential part of an OFDM receiving apparatus according to a second embodiment of the present invention.

FIG. 4 is a block diagram showing an essential part of an OFDM receiving apparatus according to a second embodiment of the present invention. The OFDM receiving apparatus of FIG. 4 differs from the apparatus of FIG. 1 in that it has a GI processing unit 30' in place of the GI combining unit 30, and in that it also has a combination evaluating unit 80A. Here, like reference numbers and characters designate similar parts or elements throughout several views of the present embodiment and the conventional art, so their detailed description is omitted here.

The GI processing unit 30' selectively combines the whole guard interval 101 of the received signal with the valid symbol portion 100, depending on the evaluation result (an instruction of combination or removal) of the combination evaluating unit 80A. Upon receipt of an instruction to combine the guard interval 101, the GI processing unit 30' combines the whole guard interval 101 with the valid symbol portion 100 (by simple adding or averaging), as in the case of the first embodiment. On the other hand, upon receipt of an instruction to remove the guard interval 101, the GI processing unit 30' excludes the guard interval 101 from the objects of reception FFT and removes guard interval 101. Here, until a combination or removal instruction is received from the combination evaluating unit 80A (that is, until the control channel demodulating/decoding unit 70 demodulates and decodes the control channel), the GI processing unit 30' holds the received signal in a buffer or the like, and waits for an instruction to perform the combination or removal processing.

Upon receipt of information (modulation scheme information) relating to the modulation scheme (QPSK, 16 QAM, 64 QAM, etc.) performed on the transmitter end, which information is included in the control channel demodulated and decoded by the control channel demodulating/decoding unit 70, the combination evaluating unit 80A evaluates whether or not the whole guard interval 101 is to be combined (by simply addition or averaging) with the valid symbol portion 100 based on the modulation scheme information, and then notifies the GI processing unit 30' of the evaluation result (combination or removal of the guard interval 101). For example, in cases where the modulation scheme is QPSK and 16 QAM, the GI processing unit 30' is notified of a combination instruction, while in cases where the modulation scheme is 64 QAM, the GI processing unit 30' is notified of a removal instruction.

In other words, the combination evaluating unit 80A and the GI processing unit 30' serve as a guard interval selective combining means which is given a function of evaluating whether or not the guard interval 101 is to be combined with the valid symbol portion 100 based on at least the transmission condition (modulation scheme) of the transmission data.

Figure 5:
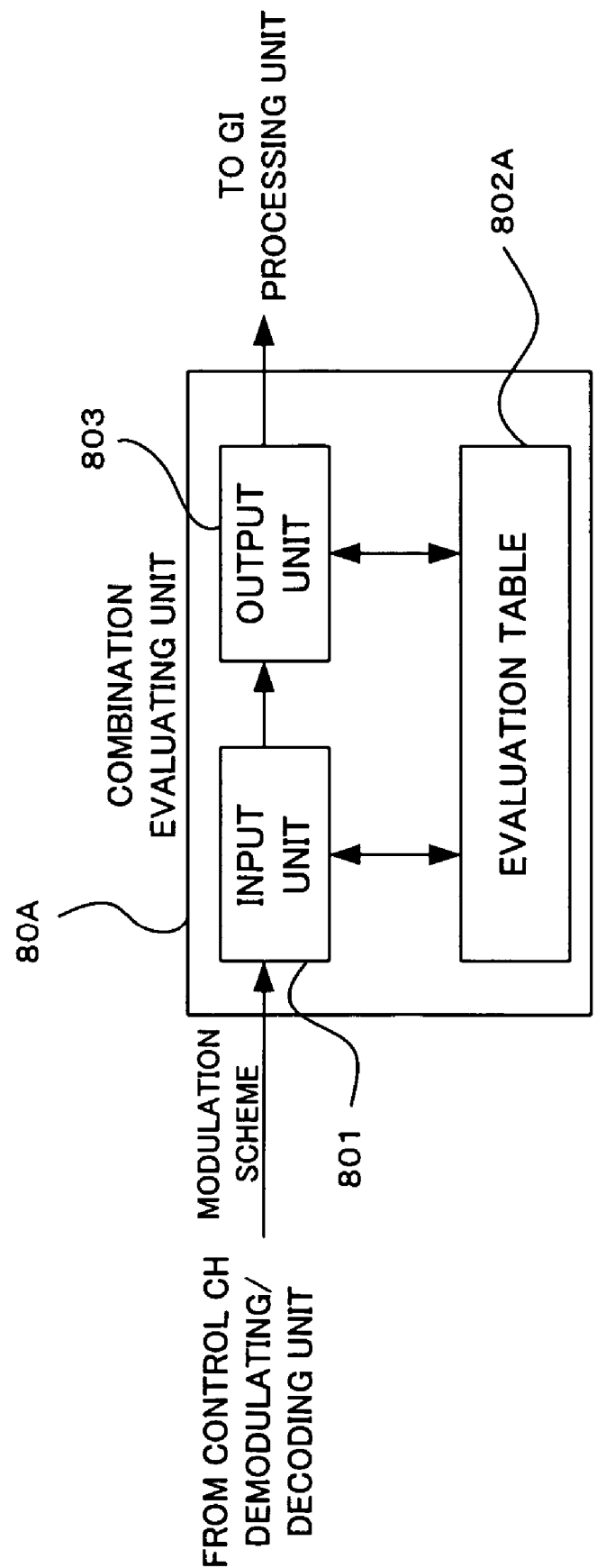
FIG. 5 is a block diagram showing an example construction of the combination evaluating unit of FIG. 4.

As shown in FIG. 5, for example, the combination evaluating unit 80A includes: an input unit 801 which receives the modulation scheme information from the control channel demodulating/decoding unit 70 as input information; an evaluation table 802A which holds such output information corresponding to the input information as shown in FIG. 6; and an output unit 803 which outputs the output information held in the evaluation table 802A to the GI processing unit 30'. As already described, if the modulation scheme information is QPSK and 16 QAM, a combination instruction is given from the evaluation table 802A to the GI processing unit 30' via the output unit 803, while if the modulation scheme information is 64 QAM, a removal instruction is given from the evaluation table 802A to the GI processing unit 30' via the output unit 803. Here, the evaluation table 802A is realized as table format data stored in a necessary storage means such as a RAM or CAM (Content-Addressable Memory). This is common to the other following embodiments.

In the OFDM receiving apparatus of the present embodiment, the receiver means 20 receives a radio signal (OFDM signal) through the receiving antenna 10, and performs necessary processing, such as downconversion to an intermediate frequency (IF) signal, A/D conversion, and orthogonal demodulation, on the received signal. The processed signal then enters the GI processing unit 30'.

The GI processing unit 30' outputs a received signal to the FFT processing unit 40 while accumulating the received signal in a buffer or the like until a combination or removal instruction is received from the combination evaluating unit 80A. After undergoing FFT processing, the received signal is input to the pilot signal extracting unit 50 which extracts a pilot signal and inputs the extracted pilot signal to the control channel demodulating/decoding unit 70.

The control channel demodulating/decoding unit 70 demodulates and decodes the control channel of the received signal based on the pilot signal, to output the modulation scheme information included in the control channel to the combination evaluating unit 80A, which evaluates whether the guard interval is to be combined or removed by the GI processing unit 30' based on the modulation scheme information. That is, according to the contents of the evaluation table 802A (predetermined rules), the combination evaluating unit 80A instructs the GI processing unit 30' to combine (in a case of QPSK or 16 QAM) or remove (in a case of 64 QAM) the guard interval.

If the instruction from the combination evaluating unit 80A is a combination instruction, the GI processing unit 30' combines (by simple addition or averaging) the whole guard interval 101 of the accumulated received signal with the valid symbol portion 100. On the other hand, if the instruction is a removal instruction, the GI processing unit 30' removes the guard interval without performing the combination processing.

After that, as with the first embodiment, the control channel demodulating/decoding unit 70 demodulates and decodes the control channel based on the pilot signal extracted from the received signal which has been subjected to FFT processing by the FFT processing unit 40, and then, the data channel demodulating/decoding unit 60 demodulates and decodes the data channel of the received signal, based on the control channel and the pilot signal, before the received signal is sent to an upper layer.

In this manner, according to the OFDM receiving apparatus of the present embodiment, it is evaluated whether or not the guard interval 101 is to be combined with the valid symbol portion 100, based on the modulation scheme on the transmitter end. Then, if the evaluation result is positive, the whole guard interval is combined with the valid symbol. On the other hand, if the evaluation result is negative (removal), the guard interval 101 is removed, so that similar effects and benefits to those of the first embodiment are obtained. In addition, it is possible to improve reception characteristics due to the transmission condition (modulation scheme) of the transmission data.

[3] Third Embodiment

Figure 7:
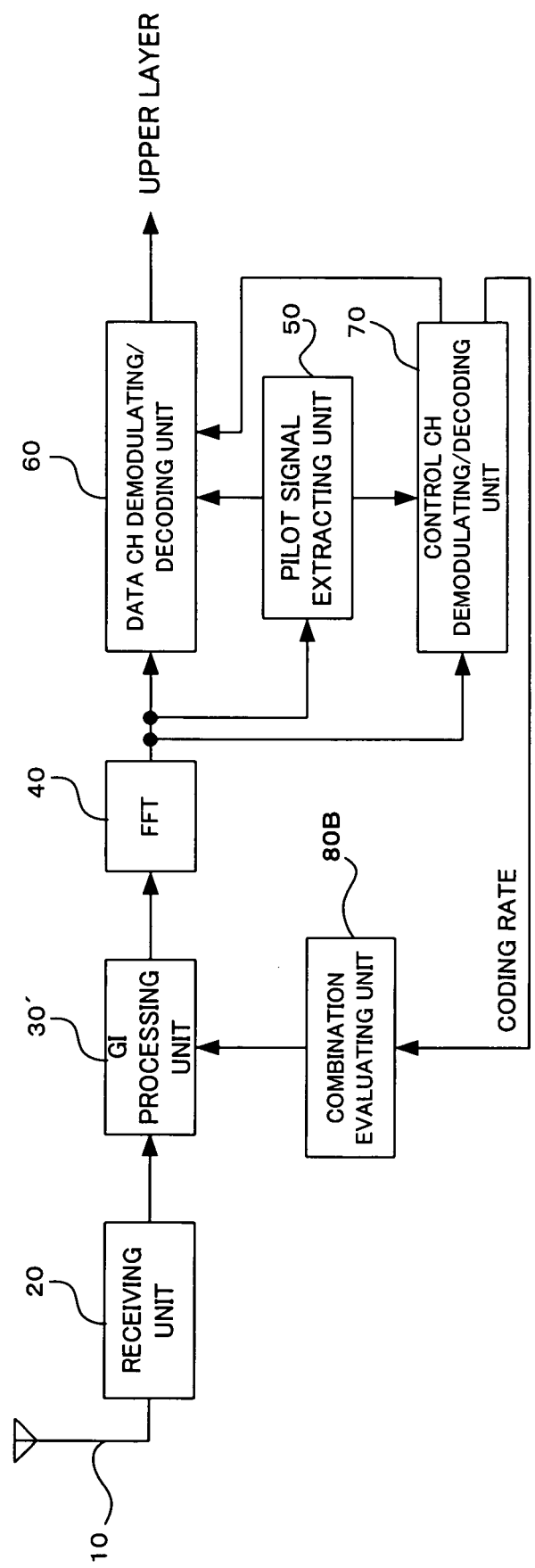
FIG. 7 is a block diagram showing an essential part of an OFDM receiving apparatus according to a third embodiment of the present invention.

FIG. 7 is a block diagram showing an essential part of an OFDM receiving apparatus according to a third embodiment of the present invention. The OFDM receiving apparatus of FIG. 7 differs from the apparatus of FIG. 4 in that it has a combination evaluating unit 80B in place of the combination evaluating unit 80A of FIG. 4.

The combination evaluating unit 80B receives information (coding rate information) relating to the coding rate (1/3, 1/2, 3/4, etc.) on the transmitter end which is included in the control channel modulated and decoded by the control channel demodulating/decoding unit 70, and evaluates whether or not the whole guard interval is to be combined (by simple addition or averaging) with the valid symbol portion 100 based on the coding rate information, and notifies the GI processing unit 30' of the evaluation result (combination or removal). For example, when the coding rate=1/3 or =1/2, a combination instruction is notified to the GI processing unit 30', and when the coding rate=3/4, a removal instruction is notified to the GI processing unit 30'.

That is, the combination evaluating unit 80B and the GI processing unit 30' have a function as a guard interval selective combining means which selectively combines the guard interval 101 with the valid symbol portion 100 based on the transmission condition (coding rate) relating to the transmission data.

Figure 8:
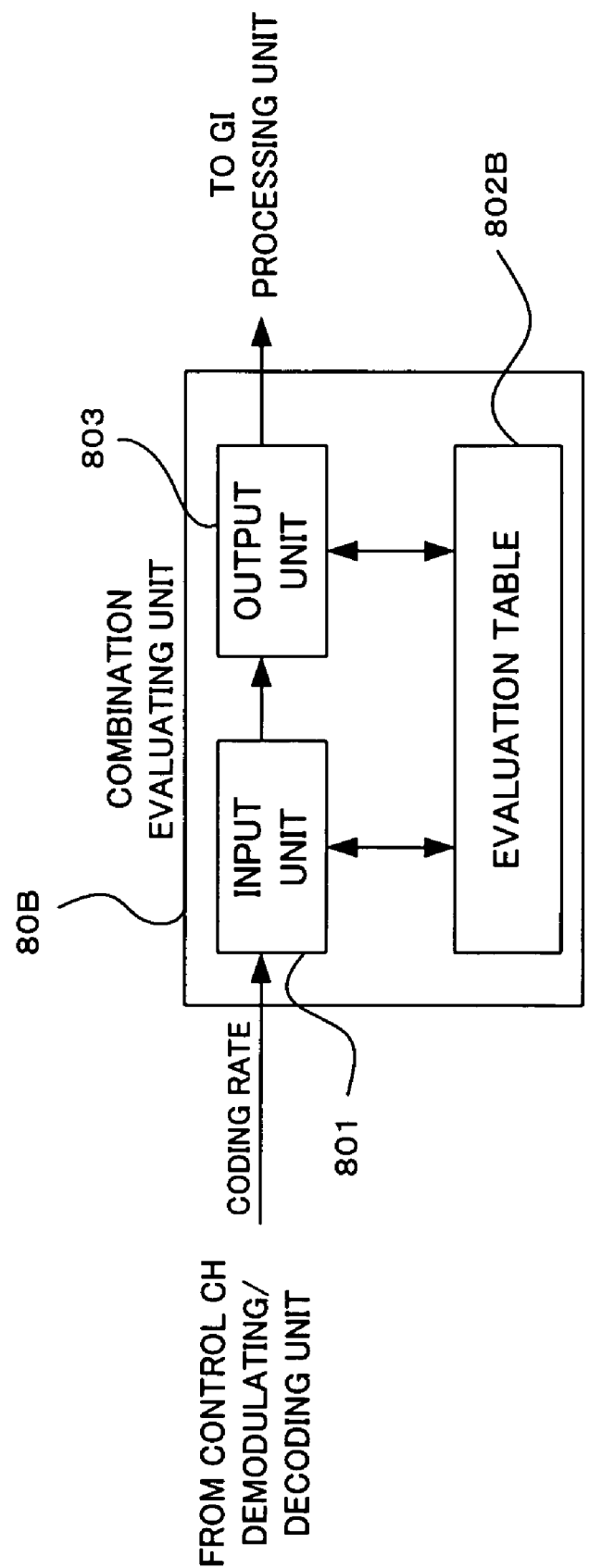
FIG. 8 is a block diagram showing an example construction of the combination evaluating unit of FIG. 7.
Figure 9:
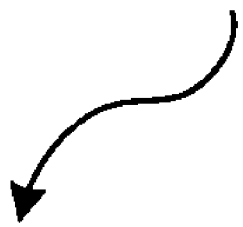
FIG. 9 is a table showing example contents of an evaluation table used by the combination evaluating unit of FIG. 8.

For this purpose, as shown in FIG. 8, the combination evaluating unit 80B includes: an input unit 801 which receives coding rate information from the control channel demodulating/decoding unit 70 as input information; an evaluation table 802B which holds such output information corresponding to the input information as shown in FIG. 9; and the output unit 803 which outputs the output information held in the evaluation table 802B to the GI processing unit 30'. As already described, if the coding rate information is 1/3 or 1/2, a combination instruction is provided from the evaluation table 802B to the GI processing unit 30' via the output unit 803. If the coding rate information is 3/4, a removal instruction is provided in the same manner.

In the OFDM receiving apparatus of the present embodiment, the receiver means 20 receives a radio signal (OFDM signal) through the receiving antenna 10, and performs necessary processing, such as downconversion to an intermediate frequency (IF) signal, A/D conversion, and orthogonal demodulation, on the received signal. The processed signal then enters the GI processing unit 30'.

The GI processing unit 30' outputs the received signal to the FFT processing unit 40 while accumulating the received signal in a buffer or the like until a combination or removal instruction is received from the combination evaluating unit 80A. After undergoing FFT processing, the received signal is input to the pilot signal extracting unit 50, which extracts a pilot signal and inputs the extracted pilot signal to the control channel demodulating/decoding unit 70.

The control channel demodulating/decoding unit 70 demodulates and decodes the control channel of the received signal based on the pilot signal, to output the coding rate information included in the control channel to the combination evaluating unit 80B, which evaluates whether the guard interval is to be combined or removed by the GI processing unit 30' based on the coding rate information. That is, according to the contents of the evaluation table 802B (predetermined rules), the combination evaluating unit 80B instructs the GI processing unit 30' to combine (when the coding rate=1/3 or 1/2 or remove (when the coding rate=3/4) the guard interval.

If the instruction from the combination evaluating unit 80B is a combination instruction, the GI processing unit 30' combines (by simple addition or averaging) the whole guard interval 101 of the accumulated received signal with the valid symbol portion 100. On the other hand, if the instruction is a removal instruction, the GI processing unit 30' removes the guard interval without performing combination processing.

After that, as with the first and second embodiments, the control channel demodulating/decoding unit 70 demodulates and decodes the control channel based on the pilot signal extracted from the received signal which has been subjected to FFT processing by the FFT processing unit 40, and then, the data channel demodulating/decoding unit 60 demodulates and decodes the data channel of the received signal, based on the control channel and the pilot signal, before the received signal is sent to an upper layer.

In this manner, according to the OFDM receiving apparatus of the present embodiment, it is evaluated whether or not the guard interval 101 is to be combined with the valid symbol portion 100, based on the coding rate on the transmitter end. Then, if the evaluation result is positive, the whole guard interval is combined with the valid symbol. On the other hand, if the evaluation result is negative (removal), the guard interval 101 is removed, so that similar effects and benefits to those of the first embodiment are obtained. In addition, it is possible to improve reception characteristics by the transmission condition (modulation scheme) of the transmission data.

[4] Fourth Embodiment

Figure 10:
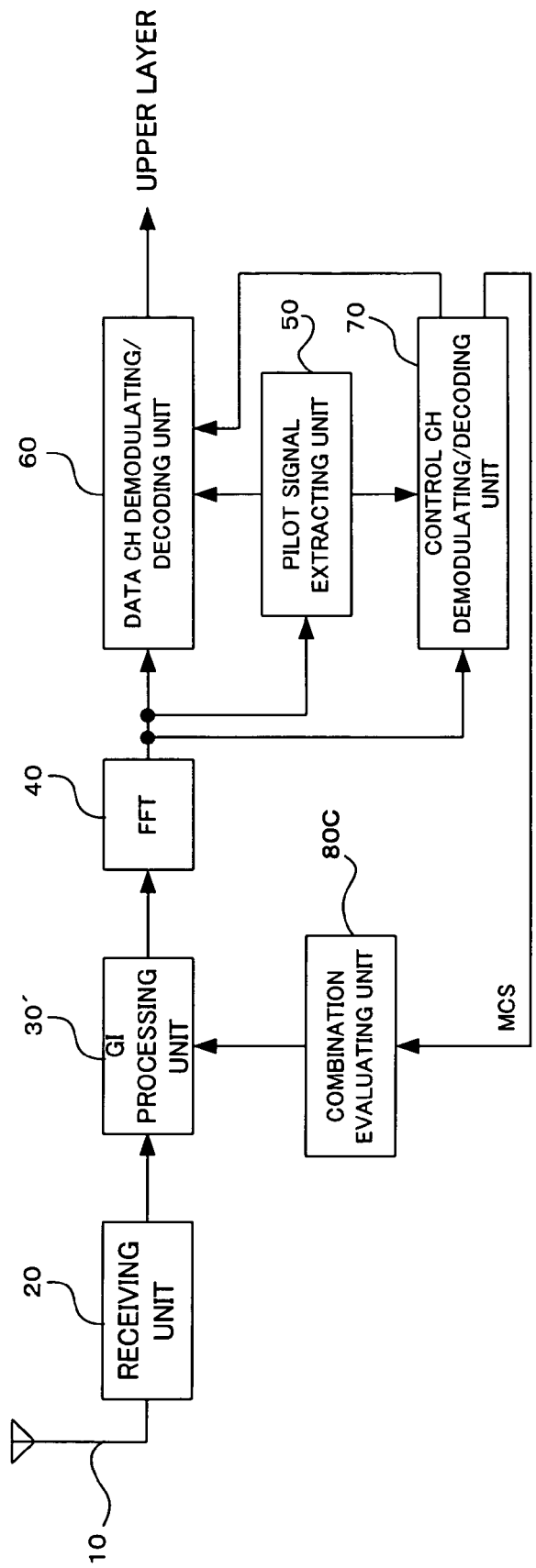
FIG. 10 is a block diagram showing an essential part of an OFDM receiving apparatus according to a fourth embodiment of the present invention.

FIG. 10 is a block diagram showing an essential part of an OFDM receiving apparatus according to a fourth embodiment of the present invention. The OFDM receiving apparatus of FIG. 10 differs from the apparatuses of FIGS. 4 and 7 in that it has a combination evaluating unit 80C in place of the combination evaluating units 80A and 80B of FIGS. 4 and 7, respectively.

The combination evaluating unit 80C receives information [MSC (Modulation and Coding Scheme) information] relating to the modulation scheme (QPSK, 16 QAM, 64 QAM, and etc.,) and the coding rate (1/3, 1/2, 3/4, etc.) on the transmitter end, which information is included in the control channel demodulated and decoded by the control channel demodulating/decoding unit 70, and evaluates whether or not the whole guard interval is to be combined (by simple addition or averaging) with the valid symbol portion 100 based on the MSC information, and notifies the GI processing unit 30' of the evaluation result (combination or removal). For example, when "the modulation scheme=QPSK and the coding rate=1/3", and when "the modulation scheme is QPSK and the coding rate=1/2", and when "the modulation scheme=16QAM and the coding rate=1/3", a combination instruction is notified to the GI processing unit 30'. On the other hand, when "the modulation scheme=QPSK and the coding rate is 3/4", and when "the modulation scheme=16 QAM and the coding rate=1/2 ", and when "the modulation scheme=16 QAM and the coding rate =3/4", a removal instruction is notified to the GI processing unit 30'.

Figure 11:
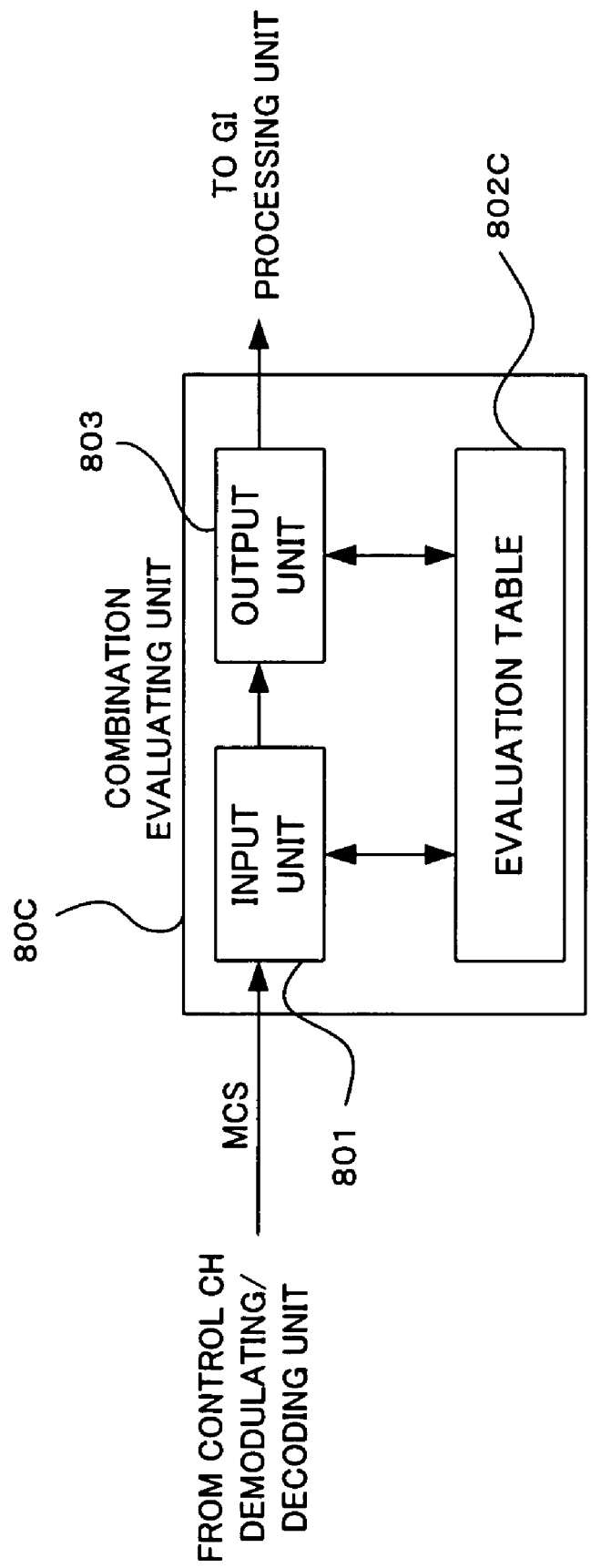
FIG. 11 is a block diagram showing an example construction of the combination evaluating unit of FIG. 10.

That is, the combination evaluating unit 80C and the GI processing unit 30' have a function as a guard interval selective combining means which selectively combines the guard interval 101 with the valid symbol portion 100 based on the transmission condition (modulation scheme and coding rate) relating to the transmission data. For this purpose, as shown in FIG. 11, the combination evaluating unit 80C includes: an input unit 801 which receives MCS information from the control channel demodulating/decoding unit 70 as input information; an evaluation table 802C which holds such output information corresponding to the input information as shown in FIG. 12; and the output unit 803 which outputs the output information held in the evaluation table 802C to the GI processing unit 30'. As already described, if the MCS information indicates that "the modulation scheme=QPSK and the coding rate=1/3", or that "the modulation scheme is QPSK and the coding rate=1/2", or that "the modulation scheme=16QAM and the coding rate=1/3", a combination instruction is provided from the evaluation table 802C to the GI processing unit 30' via the output unit 803. On the other hand, if the MCS information indicates that "the modulation scheme=QPSK and the coding rate is 3/4", or that "the modulation scheme=16 QAM and the coding rate=1/2", or that "the modulation scheme=16 QAM and the coding rate=3/4", a removal instruction is provided in the same manner.

In the OFDM receiving apparatus of the present embodiment, the receiver means 20 receives a radio signal (OFDM signal) through the receiving antenna 10, and performs necessary processing, such as downconversion to an intermediate frequency (IF) signal, A/D conversion, and orthogonal demodulation, on the received signal. The processed signal then enters the GI processing unit 30'.

The GI processing unit 30' outputs a received signal to the FFT processing unit 40 while accumulating the received signal in a buffer or the like until a combination or removal instruction is received from the combination evaluating unit 80C. After under going the FFT processing, the received signal is input to the pilot signal extracting unit 50 which extracts a pilot signal and inputs the extracted pilot signal to the control channel demodulating/decoding unit 70.

The control channel demodulating/decoding unit 70 demodulates and decodes the control channel of the received signal based on the pilot signal, to output MCS information included in the control channel to the combination evaluating unit 80C, which evaluates whether the guard interval is to be combined or removed by the GI processing unit 30' based on the MCS information. That is, according to the contents of the evaluation table 802C (predetermined rules), the combination evaluating unit 80C instructs the GI processing unit 30' to combine (when "the modulation scheme=QPSK and the coding rate=1/3", and when "the modulation scheme=QPSK and the coding rate=1/2", and when "the modulation scheme=16 QAM and the coding rate is 1/3"), or to remove (when "the modulation scheme=QPSK and the coding rate=3/4", and when "the modulation scheme is 16 QAM and the coding rate=1/2", and when "the modulation scheme is 16 QAM and the coding rate=3/4") the guard interval.

If the instruction from the combination evaluating unit 80C is a combination instruction, the GI processing unit 30' combines (by simple addition or averaging) the whole guard interval 101 of the accumulated received signal with the valid symbol portion 100. On the other hand, if the instruction is a removal instruction, the GI processing unit 30' removes the guard interval without performing the combination processing.

After that, as in the cases of the first through third embodiments, the control channel demodulating/decoding unit 70 demodulates and decodes the control channel based on the pilot signal extracted from the received signal which has been subjected to the FFT processing by the FFT processing unit 40, and then, the data channel demodulating/decoding unit 60 demodulates and decodes the data channel of the received signal, based on the control channel and the pilot signal, before the received signal is sent to an upper layer.

In this manner, according to the OFDM receiving apparatus of the present embodiment, it is evaluated whether or not the guard interval 101 is to be combined with the valid symbol portion 100, based on a combination (MSC information) of the modulation scheme and the coding rate on the transmitter end. Then, if the evaluation result is positive, the whole guard interval is combined with the valid symbol. On the other hand, if the evaluation result is negative (removal), the guard interval 101 is removed, so that similar effects and benefits to those of the first embodiment are obtained. In addition, it is possible to improve reception characteristics by the transmission condition (a combination of the modulation scheme and the coding rate) of the transmission data.

Figure 13:
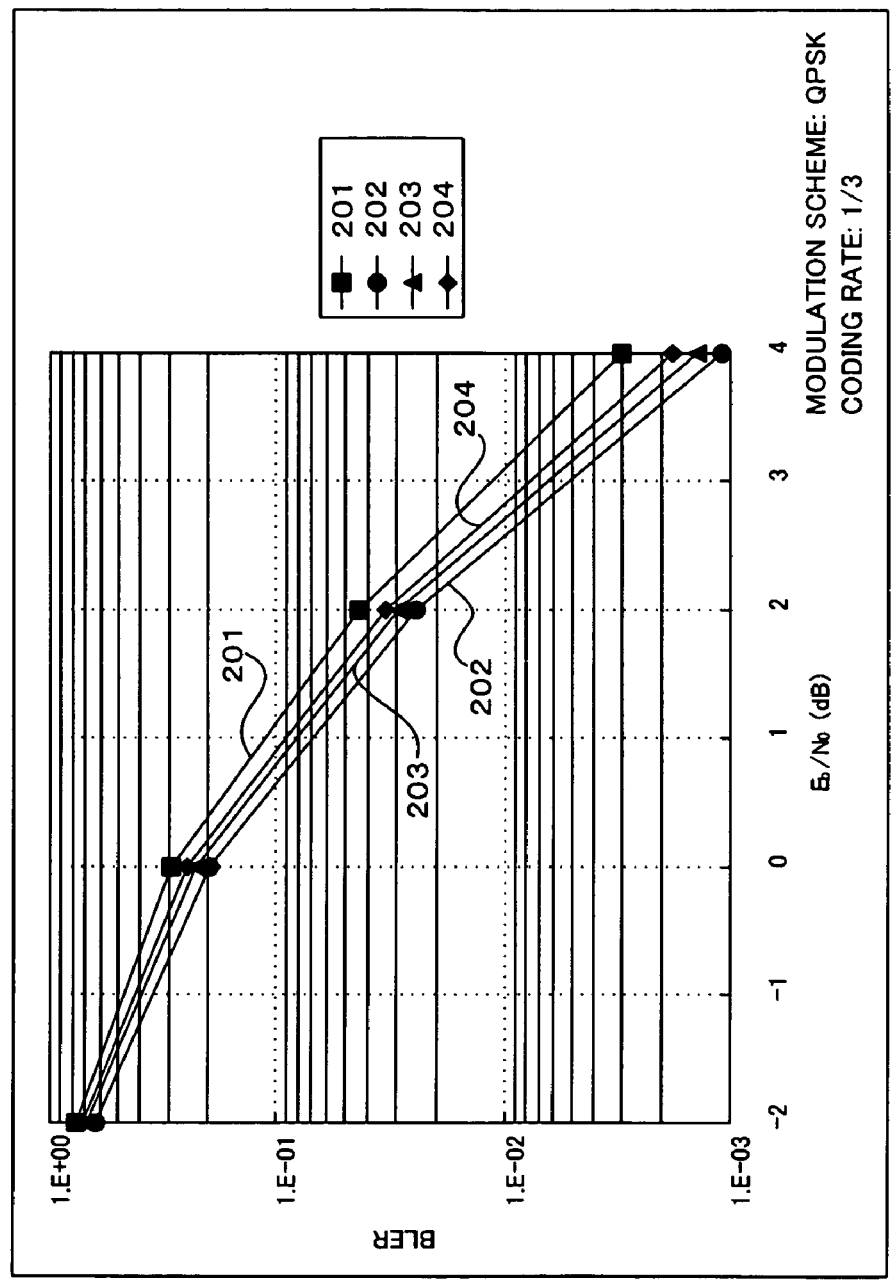
FIG. 13 is a graph indicating reception characteristics of the OFDM apparatus of FIG. 10 in comparison with a conventional art.

For example, FIG. 13 shows a comparison between the result of simulation of reception characteristics [BLER (Block Error) characteristic against the power density-to-noise power density ratio (Eb/No)] in conventional arts (a case where a guard interval 101 is simply removed and the above patent document 1) and the result of simulation of reception characteristic (BLER characteristic against Eb/No) in the present embodiment [when a guard interval 101 is combined (by simple addition or averaging) with a valid symbol 100] when "the modulation scheme=QPSK and the coding rate=1/3". Likewise, FIG. 14 shows the same comparison when "the modulation scheme=16 QAM and the coding rate=1/3", and FIG. 15 shows the same comparison when "the modulation scheme=16 QAM and the coding rate=3/4".

As is indicated in FIG. 13, when "the modulation scheme=QPSK and the coding rate=1/3", the BLER characteristic is improved in a case where the whole guard interval 101 is added to the valid symbol portion 100 (see plot 203) and in a case where averaging is performed (see plot 202) in comparison with a case where the guard interval 101 is simply removed (see plot 201) and a case where the technique of the above patent document 1 is applied (see plot 204).

Figure 14:
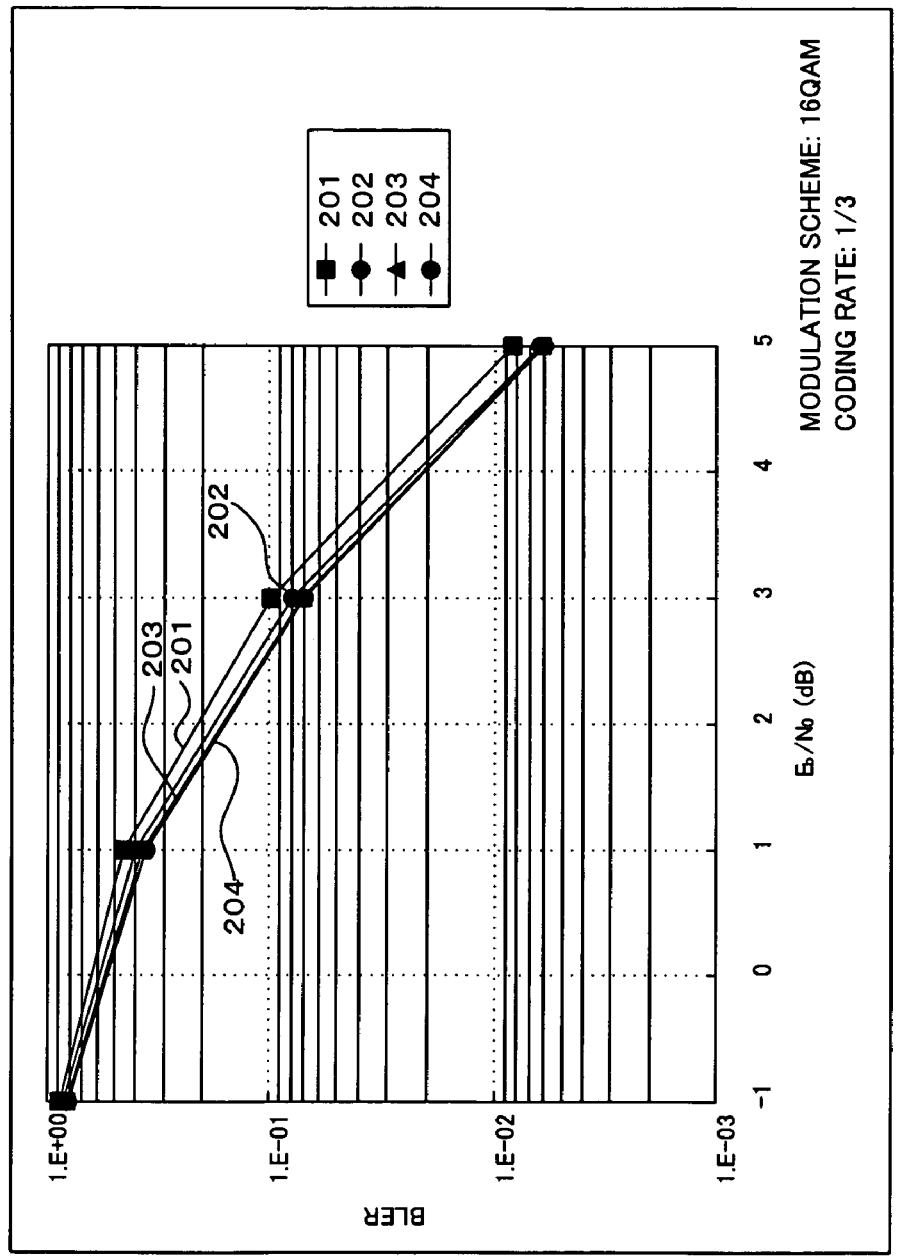
FIG. 14 is a graph indicating reception characteristics of the OFDM apparatus of FIG. 10 in comparison with a conventional art.

Likewise, as is indicated in FIG. 14, when "the modulation scheme=16 QAM and the coding rate=1/3", the BLER characteristic is improved in a case where the whole guard interval is added to the valid symbol portion 100 (see plot 203) and in a case where averaging is performed (see plot 202) in comparison with a case where the guard interval 101 is simply removed (see plot 201) and a case where the technique of the above patent document 1 is applied (see plot 204).

Figure 15:
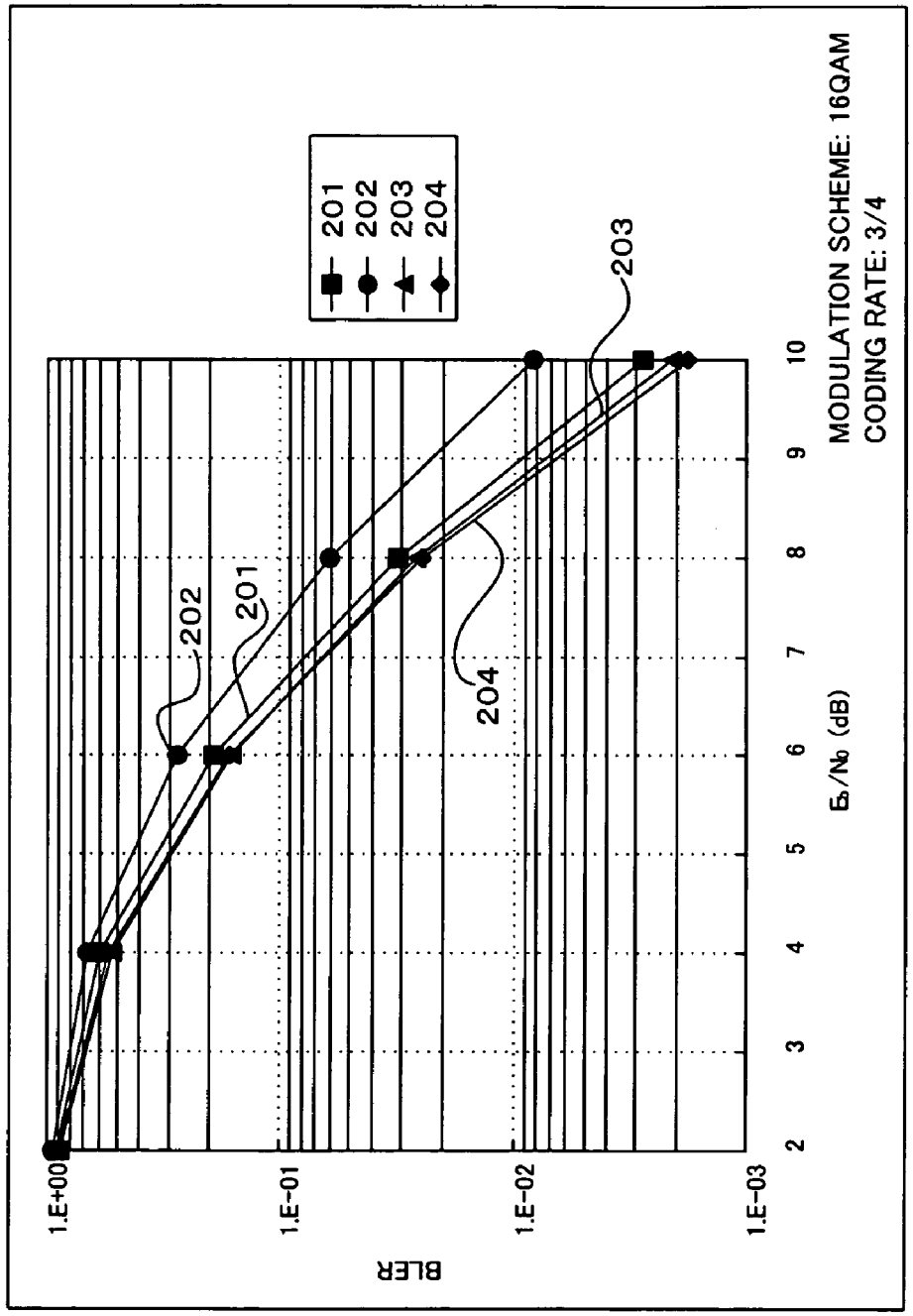
FIG. 15 is a graph indicating reception characteristics of the OFDM apparatus of FIG. 10 in comparison with a conventional art.

In contrast, as indicated in FIG. 15, taking an example where "the modulation scheme=16 QAM and the coding rate=3/4", the GI processing unit 30' does not perform the combination processing in a case where the guard interval 101 is simply removed (see plot 201) or in a case where the technique of the above patent document 1 is applied (see plot 204), when the whole guard interval 101 is added to the valid symbol portion 100 (see plot 203). On the other hand, when averaging is performed (see plot 202), the BLER characteristic is improved in comparison with a case where the guard interval 101 is simply removed (see plot 201).

[5] Fifth Embodiment

Figure 16:
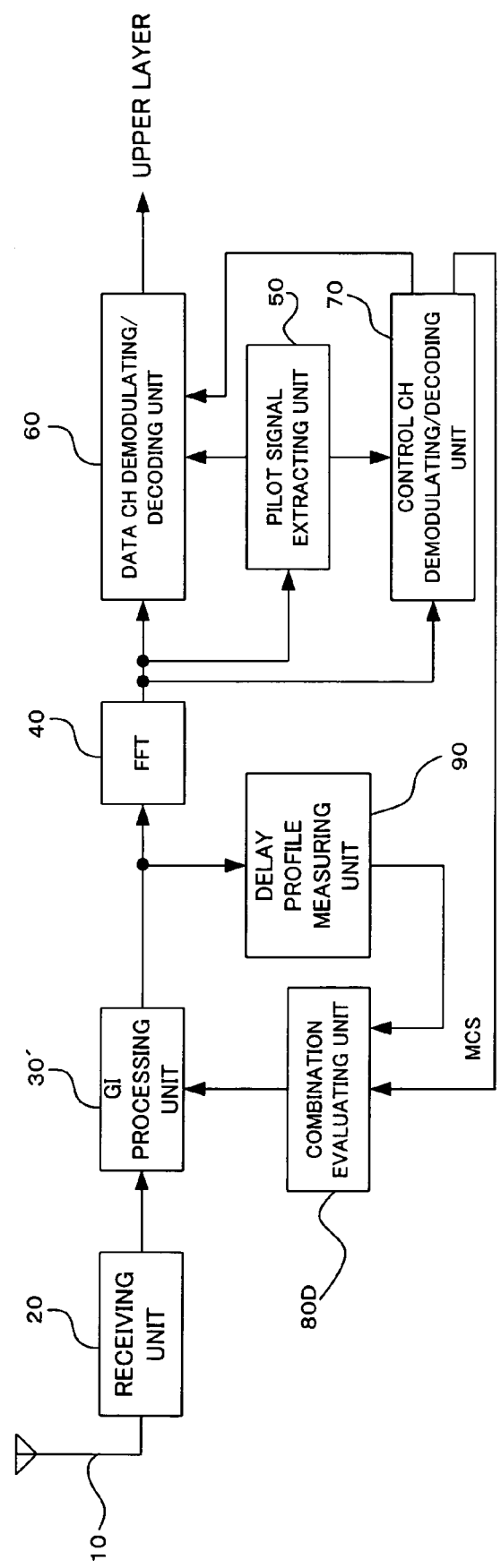
FIG. 16 is a block diagram showing an essential part of an OFDM receiving apparatus according to a fifth embodiment of the present invention.

FIG. 16 is a block diagram showing an essential part of an OFDM receiving apparatus according to a fifth embodiment of the present invention. The OFDM receiving apparatus of FIG. 16 differs from the apparatus of the fourth embodiment of FIG. 10 in that it has a combination evaluating unit 80D in place of the combination evaluating unit 80C of FIG. 10 and in that it also has a delay profile measuring unit 90. Like reference numbers and characters designate similar parts or elements throughout several views of the present embodiment and the conventional art, so their detailed description is omitted here.

The delay profile measuring unit 90 measures an arrival delay time characteristic (delay profile) of multiple reflected waves (multipath) which are caused on a radio propagation path, based on a received signal. The combination evaluating unit 80D evaluates whether or not the GI processing unit 30' should combine (by simple addition or averaging) the whole guard interval with the valid symbol portion 100, based on the delay profile measured by the delay profile measuring unit 90 and on the MCS information, which was already described in the fourth embodiment.

For example, the combination evaluating unit 80D evaluates whether or not the guard interval 101 is to be combined, based on the MCS information, in the same manner as in the fourth embodiment. After that, the combination evaluating unit 80D further evaluates whether or not the guard interval 101 is to be combined, based on the result of measurement of a delay profile. In other words, the combination evaluating unit 80D of the present embodiment evaluates whether or not the guard interval 101 is to be combined, based on the evaluation condition according to the MCS information of the fourth embodiment, in view of the state of the delay profile. Since the evaluation based on the MCS information can be performed in the same way as in the fourth embodiment, the combination evaluating unit 80D only needs to be constructed as shown in FIGS. 11 and 12.

In the OFDM receiving apparatus of the present embodiment, the receiver means 20 receives a radio signal (OFDM signal) through the receiving antenna 10, and performs necessary processing, such as downconversion to an intermediate frequency (IF) signal, A/D conversion, and orthogonal demodulation, on the received signal. The processed signal then enters the GI processing unit 30'.

The GI processing unit 30' outputs the received signal to the FFT processing unit 40 while accumulating the received signal in a buffer or the like until a combination or removal instruction is received from the combination evaluating unit 80A. After undergoing the FFT processing, the received signal is input to the pilot signal extracting unit 50, which extracts a pilot signal and inputs the extracted pilot signal to the control channel demodulating/decoding unit 70.

The control channel demodulating/decoding unit 70 demodulates and decodes the control channel of the received signal based on the pilot signal, to output MCS information included in the control channel to the combination evaluating unit 80D.

The combination evaluating unit 80D evaluates whether the guard interval is to be combined or removed by the GI processing unit 30' based on the MCS information. That is, according to the contents of the evaluation table 802C (predetermined rules), the combination evaluating unit 80D instructs the GI processing unit 30' to combine (when "the modulation scheme=QPSK and the coding rate=1/3", and when "the modulation scheme=QPSK and the coding rate=1/2", and when "the modulation scheme=16 QAM and the coding rate is 1/3"), or to remove (when "the modulation scheme=QPSK and the coding rate=3/4", and when "the modulation scheme is 16 QAM and the coding rate=1/2", and when "the modulation scheme is 16 QAM and the coding rate=3/4") the guard interval (step S1 and step S2 of FIG. 17).

Figure 17:
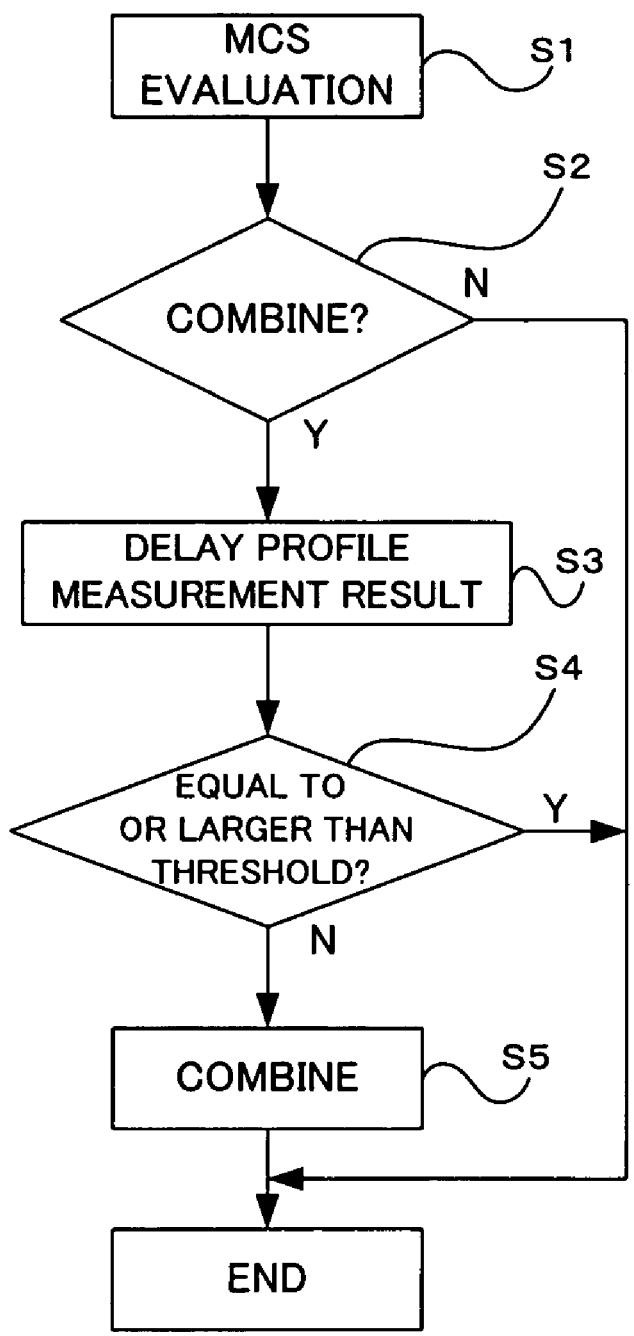
FIG. 17 is a flowchart for describing an operation of the OFDM receiving apparatus of FIG. 16.
Figure 18:
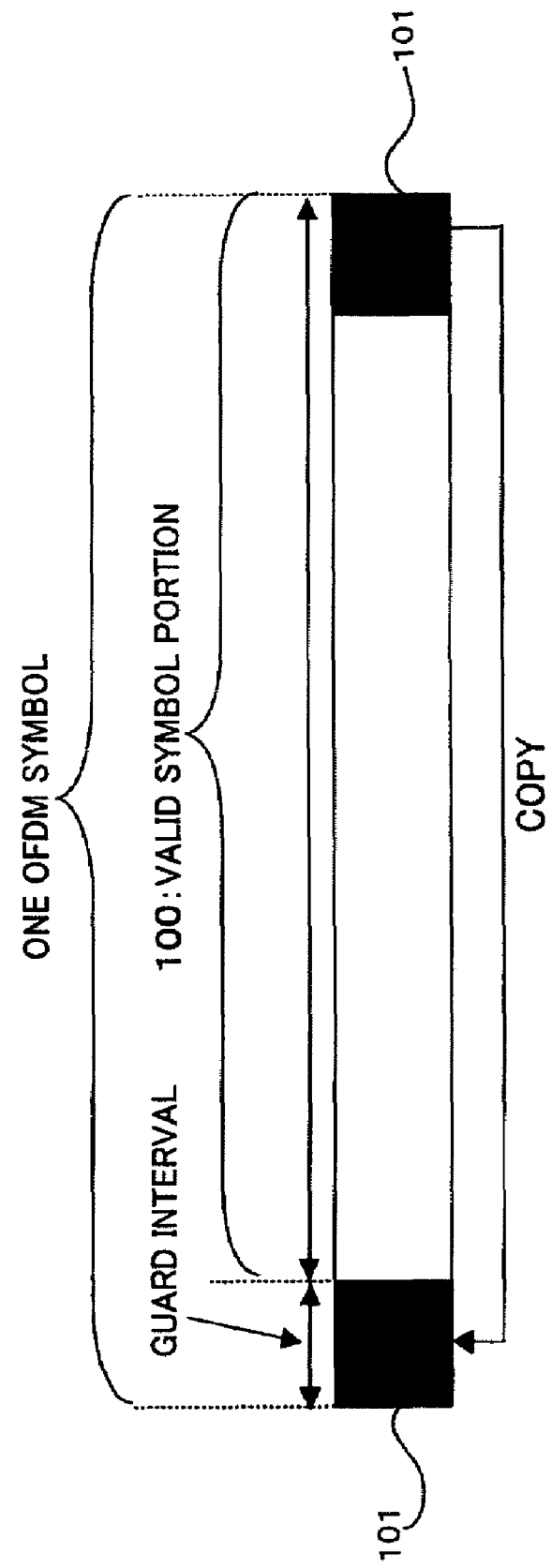
FIG. 18 is a diagram showing a construction of a single OFDM symbol for describing a guard interval.
Figure 19:
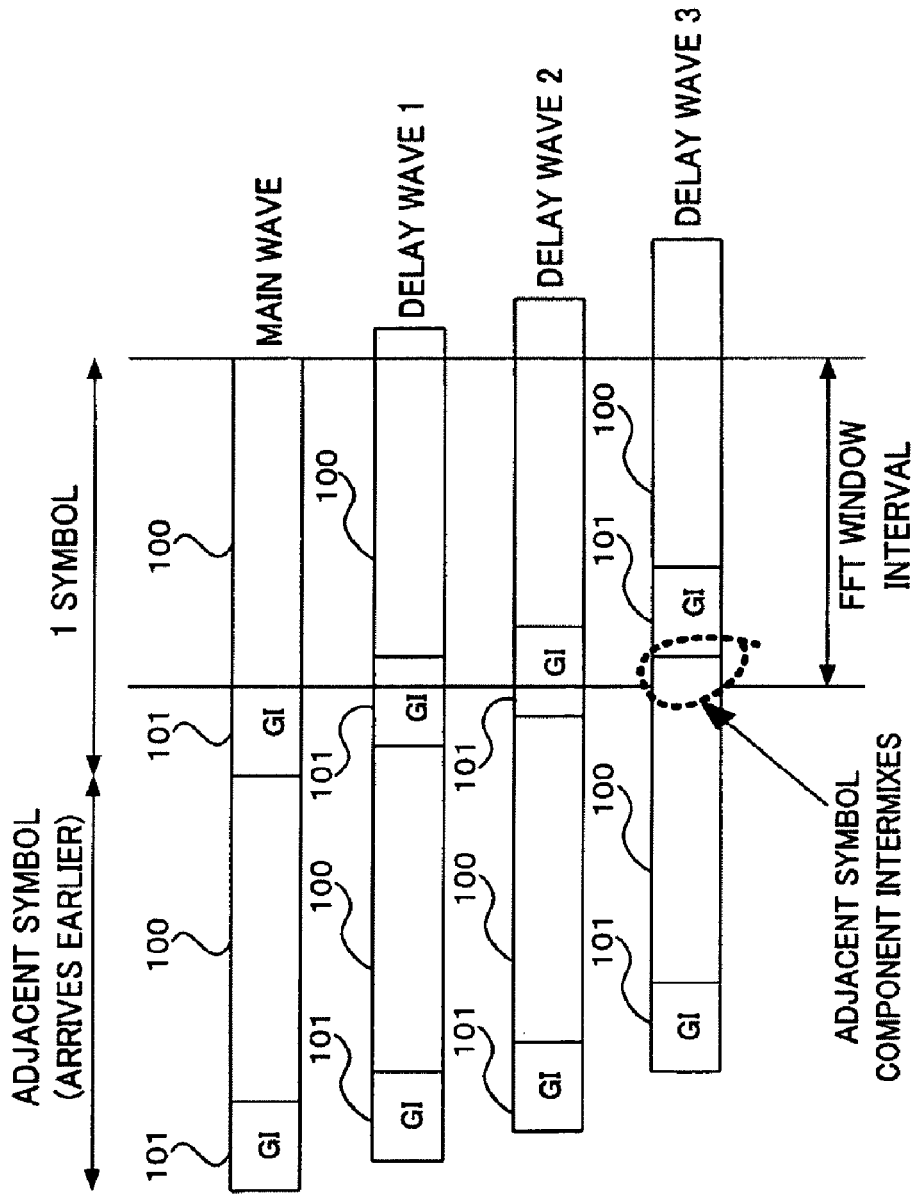
FIG. 19 is a schematic diagram for describing influence of delay waves (multipath interference) in the OFDM scheme.
Figure 20:
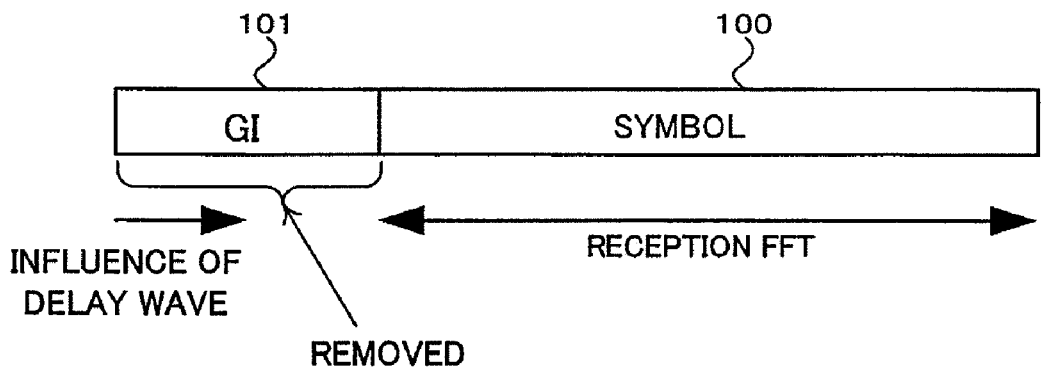
FIG. 20 is a diagram showing a construction of a single OFDM symbol for describing a conventional art.
Figure 21:
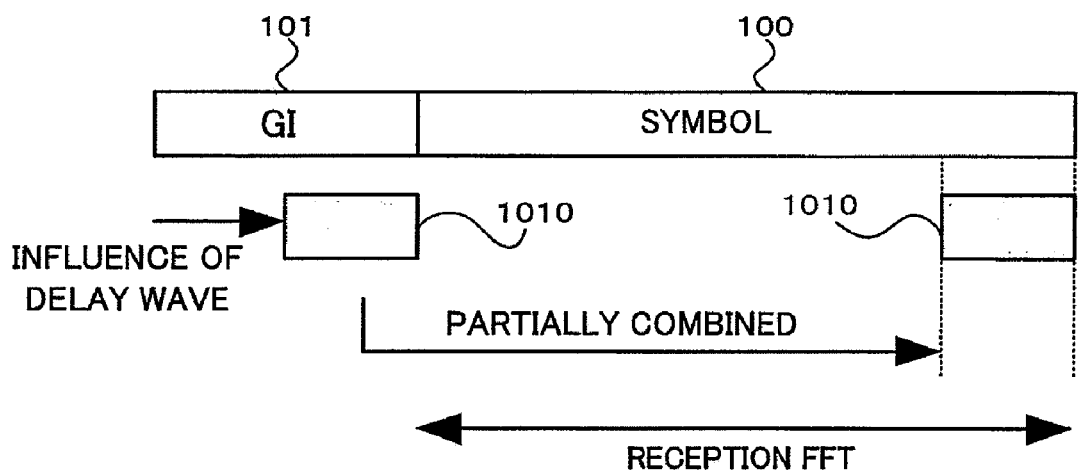
FIG. 21 is a schematic diagram for describing another conventional art.

As a result, if it is evaluated that the guard interval 101 is not to be combined, a removal instruction to remove the guard interval 101 is given to the GI processing unit 30', whereby the guard interval 101 is not combined with the valid symbol portion 100 (N route of step S2 in FIG. 17). On the other hand, if it is evaluated that the guard interval 101 is to be combined, the combination evaluating unit 80D evaluates whether or not the result of measurement of the delay profile by the delay profile measuring unit 90 is equal to or greater than a specific threshold value (step S3 and step S4 in FIG. 17). If the measurement result is smaller than the threshold value, the combination evaluating unit 80D instructs the GI processing unit 30' to combine the guard interval 101 with the valid symbol portion 100 (from N route of step S4 to step S5 in FIG. 17).

On the other hand, if the measurement result of the delay profile is equal to or greater than the threshold, the combination evaluating unit 80D instructs the GI processing unit 30' to remove the guard interval 101 even when a combination decision has been made based on the MCS information, so that the GI processing unit 30' does not combine the guard interval 101 with the valid symbol portion 100 (Y route of step S4 of FIG. 17).

After that, as in the cases of the first through fourth embodiments, the control channel demodulating/decoding unit 70 demodulates and decodes the control channel based on the pilot signal extracted from the received signal which has been subjected to FFT processing by the FFT processing unit 40, and then, the data channel demodulating/decoding unit 60 demodulates and decodes the data channel of the received signal, based on the control channel and the pilot signal, before the received signal is sent to an upper layer.

Here, the above threshold value can be set to a value such that combination of the guard interval 101 with the valid symbol portion 100 will deteriorate the reception characteristic, depending upon the delay profile (reception environment). For example, the greater the delay profile measurement result, the greater the influence of delay waves, so that combination of the guard interval 101 is not performed. In contrast, the smaller the delay profile measurement result, the smaller the influence of delay waves, so that combination of the guard interval 101 is performed.

In this manner, according to the OFDM receiving apparatus of the present embodiment, it is evaluated whether or not the guard interval 101 is to be combined with the valid symbol portion 100, based on a combination (MSC information) of the modulation scheme and the coding rate on the transmitter end and on the delay profile of the received signal. Therefore, similar effects and benefits to those of the first embodiment are obtained, and in addition, it is possible to improve reception characteristics more efficiently by utilizing the delay profile (reception environment) in evaluating the necessity or non-necessity of combination of the guard interval 101 with the valid symbol portion 100.

[6] Other Modifications

Further, the present invention should by no means be limited to the above-illustrated embodiment, but various changes or modifications may be suggested without departing from the gist of the invention.

For example, in the above description, the present invention is applied to a communication system employing the OFDM scheme. The present invention is also applicable to other communication systems where GI or the equivalent technology, that is, the technology of transmitting data redundantly in time for improving immunity to multipath interference, is employed therein, whereby similar effects and benefits to those of the above embodiments will be realized.

Moreover, the method described in each of the above embodiments can be appropriately combined to realize an optimal method for an object system.

What is claimed is:

1. A receiving processing method performed at a receiver in a communication system which has a function of transmitting a part of a valid symbol of data, as a guard interval, redundantly in time, said receiving processing method comprising:

receiving, in a receiving unit of the receiver, the data; and combining, in a guard interval combining unit of the receiver, the whole of the guard interval of the received data with the valid symbol.

2. The receiving processing method according to claim 1, further comprising evaluating, in a guard interval selective combining unit of the receiver, whether or not the guard interval is to be combined with the valid symbol, based on at least a transmission condition relating to the data.

3. The receiving processing method according to claim 2,
wherein the communication system has a function of notifying the receiver end of both or either of modulation scheme information, which relates to a modulation scheme of the data, and encoding rate information, which relates to an encoding rate of the data, as the transmission condition, and
wherein said method further comprises:
evaluating, in a combination evaluating unit of the receiver, whether or not the guard interval is to be combined with the valid symbol based on the notified transmission condition; and
combining, in a guard interval combination processing unit of the receiver, if the evaluation result is positive, the guard interval with the valid symbol.

4. The receiving processing method according to claim 3, further comprising:
measuring, in a delay profile measuring unit of the receiver, a delay profile of the received data; and
adding, in said combination evaluating unit of the receiver, the measurement result to evaluation conditions for evaluating whether or not the guard interval is combined with the valid symbol, for performing the above-mentioned evaluation.

5. The receiving processing method according to claim 3, wherein if the evaluation result is that the guard interval is not to be combined with the valid symbol, the guard interval is removed in said guard interval combination processing unit of the receiver.

6. The receiving processing method according to claim 1, wherein a simple addition method is applied, in a simple addition unit of the receiver, when the guard interval is combined with the valid symbol.

7. The receiving processing method according to claim 1, wherein an averaging method is applied, in an averaging unit of the receiver, when the guard interval is combined with the valid symbol.

8. A receiving apparatus in a communication system which has a function of transmitting a part of a valid symbol of data, as a guard interval, redundantly in time, said receiving apparatus comprising:
a receiving unit which receives the data; and
a guard interval combining unit which combines the whole of the guard interval of the data, which is received by said receiving unit, with the valid symbol.

9. The receiving apparatus according to claim 8, wherein said guard interval combining unit is configured as a guard interval selective combining unit which evaluates whether or not the guard interval is to be combined with the valid symbol, based on at least a transmission condition relating to the data.

10. The receiving apparatus according to claim 9,
wherein the communication system has a function of notifying the receiver end of both or either of modulation scheme information, which relates to a modulation scheme of the data, and encoding rate information, which relates to an encoding rate of the data, as the transmission condition, and
wherein said guard interval selective combining unit includes:

a combination evaluating unit which evaluates whether or not the guard interval is to be combined with the valid symbol based on the notified transmission condition; and a guard interval combination processing unit which combines, if the evaluation result is positive, the guard interval with the valid symbol.

11. The receiving apparatus according to claim 10, further comprising a delay profile measuring unit which measures a delay profile of the received data, wherein said combination evaluating unit adds the measurement result to evaluation conditions for evaluating whether or not the guard interval is combined with the valid symbol, for performing the above-mentioned evaluation.

12. The receiving apparatus according to claim 10, wherein said guard interval combination processing unit is configured as a simple addition unit which combines the guard interval with the valid symbol by a simple addition method.

13. The receiving apparatus according to claim 10, wherein said guard interval combination processing unit is configured as an averaging unit which combines the guard interval with the valid symbol by an averaging method.

14. The receiving apparatus according to claim 10, wherein said guard interval combination processing unit removes, if the evaluation result is that the guard interval is not to be combined with the valid symbol, the guard interval.

* * * * *